US011021833B1

United States Patent
Ray et al.

(10) Patent No.: US 11,021,833 B1
(45) Date of Patent: Jun. 1, 2021

(54) SYSTEMS, METHODS, AND APPARATUSES FOR MANAGING THE MIXTURE AND DELIVERY OF A PLURALITY OF LAUNDRY PRODUCTS TO A PLURALITY OF WASHING MACHINES

(71) Applicant: GreenFill LLC, McDonough, GA (US)

(72) Inventors: Lorna G. Ray, McDonough, GA (US); David N. Ray, McDonough, GA (US)

(73) Assignee: Greenfill LLC, McDonough, GA (US)

( * ) Notice: Subject to any disclaimer, the term of this patent is extended or adjusted under 35 U.S.C. 154(b) by 595 days.

(21) Appl. No.: 15/412,971

(22) Filed: Jan. 23, 2017

Related U.S. Application Data

(60) Provisional application No. 62/286,361, filed on Jan. 23, 2016.

(51) Int. Cl.
*D06F 39/02* (2006.01)
*D06F 31/00* (2006.01)
*B67D 7/14* (2010.01)
*G06Q 20/02* (2012.01)
*D06F 33/00* (2020.01)

(52) U.S. Cl.
CPC ......... *D06F 39/028* (2013.01); *D06F 39/022* (2013.01); *B67D 7/14* (2013.01); *D06F 31/00* (2013.01); *D06F 33/00* (2013.01); *G06Q 20/02* (2013.01)

(58) Field of Classification Search
CPC ....... D06F 39/02; D06F 39/022; D06F 39/028
See application file for complete search history.

(56) References Cited

U.S. PATENT DOCUMENTS

| 4,690,305 A * | 9/1987 | Copeland ............ A47L 15/4436 |
| | | 222/189.06 |
| 4,845,965 A | 7/1989 | Copeland et al. |
| 5,435,157 A | 7/1995 | Laughlin |
| 7,489,297 B2 * | 2/2009 | Hohmann ............... G06F 3/043 |
| | | 345/156 |
| 8,117,703 B2 | 2/2012 | Walker et al. |
| 8,355,913 B2 * | 1/2013 | Kiss ........................ G10L 15/26 |
| | | 704/235 |
| 2003/0154557 A1* | 8/2003 | Sears .................... D06F 39/005 |
| | | 8/158 |
| 2013/0133700 A1* | 5/2013 | Classen ................. D06F 39/022 |
| | | 134/25.2 |
| 2016/0067660 A1* | 3/2016 | Tumini ................. D06F 39/022 |
| | | 137/15.01 |
| 2017/0085390 A1* | 3/2017 | Belveal ................... D06F 34/28 |

\* cited by examiner

*Primary Examiner* — Kevin G Lee
(74) *Attorney, Agent, or Firm* — Morris, Manning & Martin, LLP; Daniel E. Sineway, Esq.; Daniel Thomas Begasse

(57) ABSTRACT

A system, method, and apparatus for controlling a plurality of washers and the mixture and deliver of laundry product solutions to the plurality of washers. Generally, a GUI allows for a user to select one or more washers and one or more laundry products. A computing device receives the user input and controls the system hardware to further execute the input. The system uses a combination of solenoids and peristaltic pumps to direct water flow to be mixed with the selected solid and/or liquid laundry products. The water and laundry product solution is further directed to the one or more appropriate washer. A third-party payment terminal allows for the user to pay before using the system. The system, method, and apparatus generally allow for a resource efficient and cost effective solution to laundry needs.

7 Claims, 13 Drawing Sheets

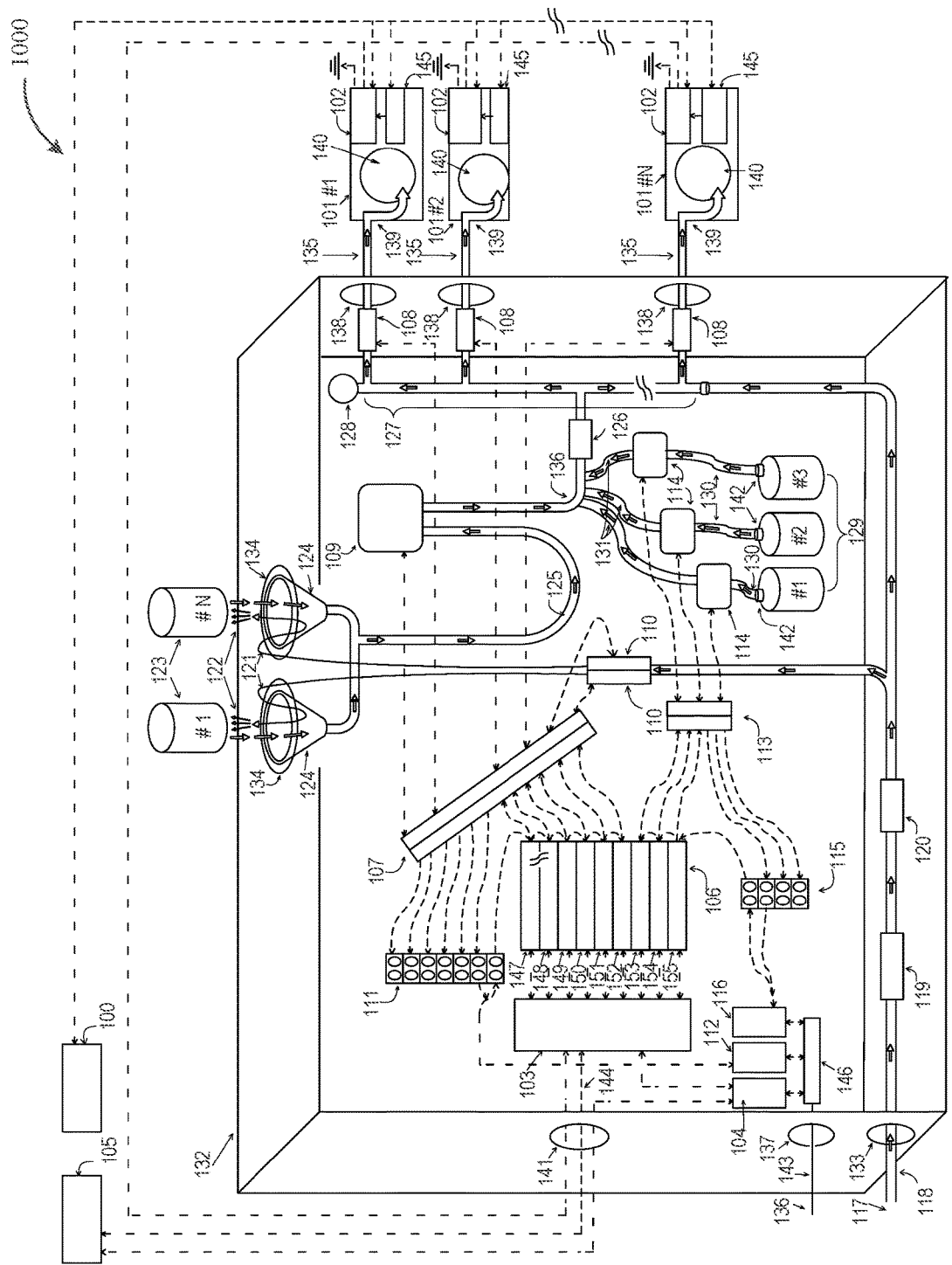
FIG. 1A: EXEMPLARY OPERATIONAL SCHEMATIC

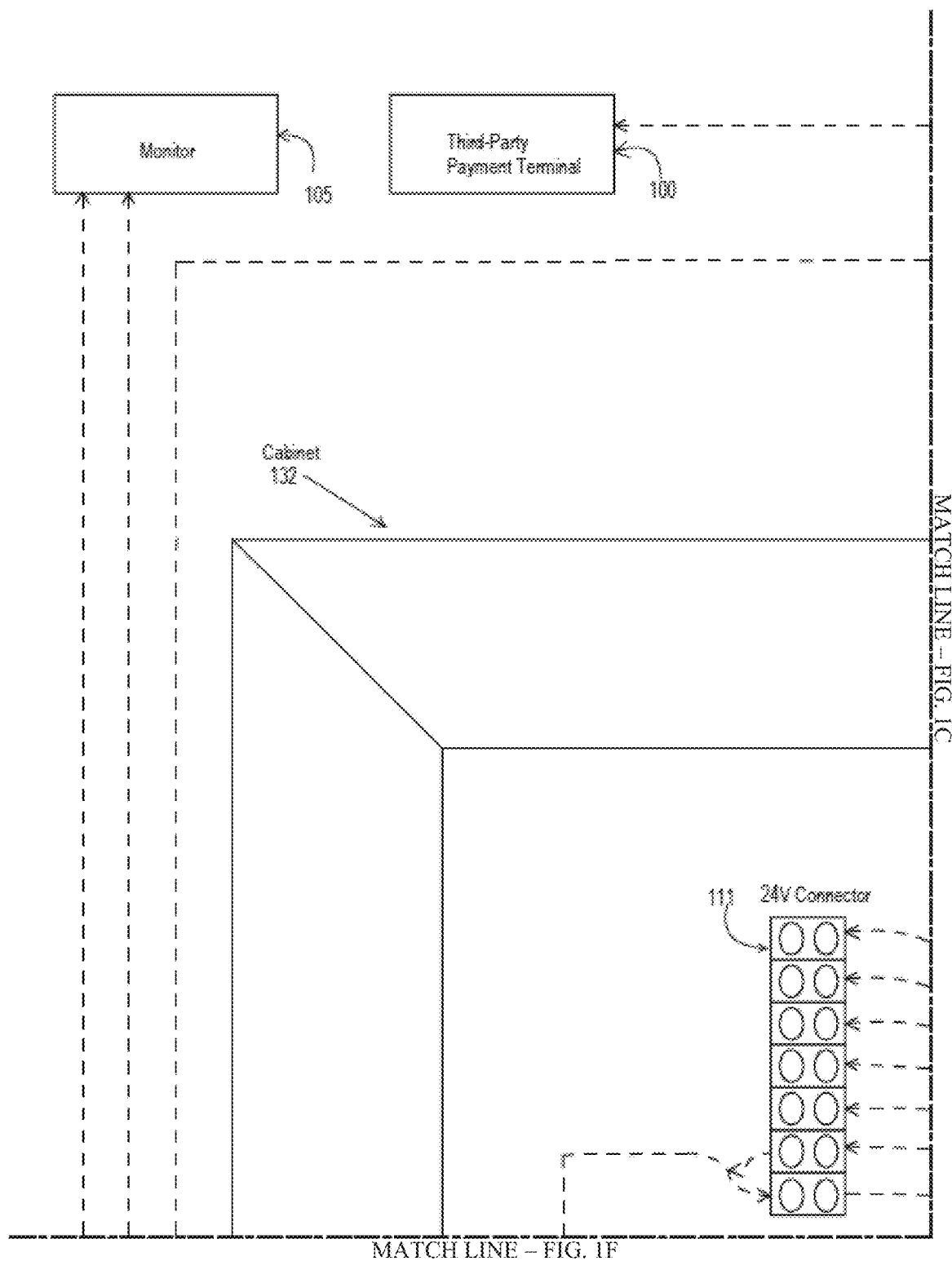
FIG. 1B: EXEMPLARY OPERATIONAL SCHEMATIC SECTION 1B.

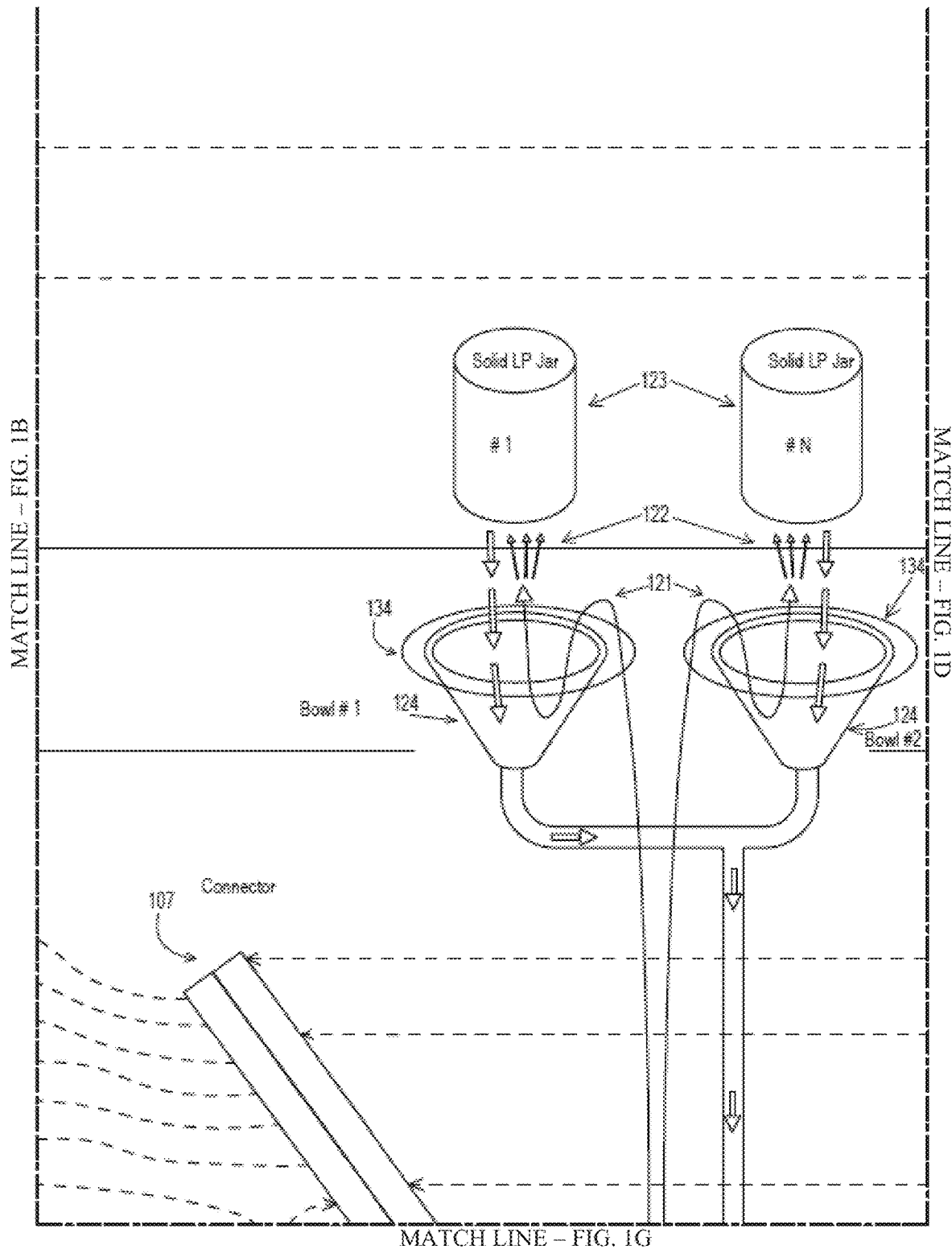
FIG. 1C: EXEMPLARY OPERATIONAL SCHEMATIC SECTION 1C.

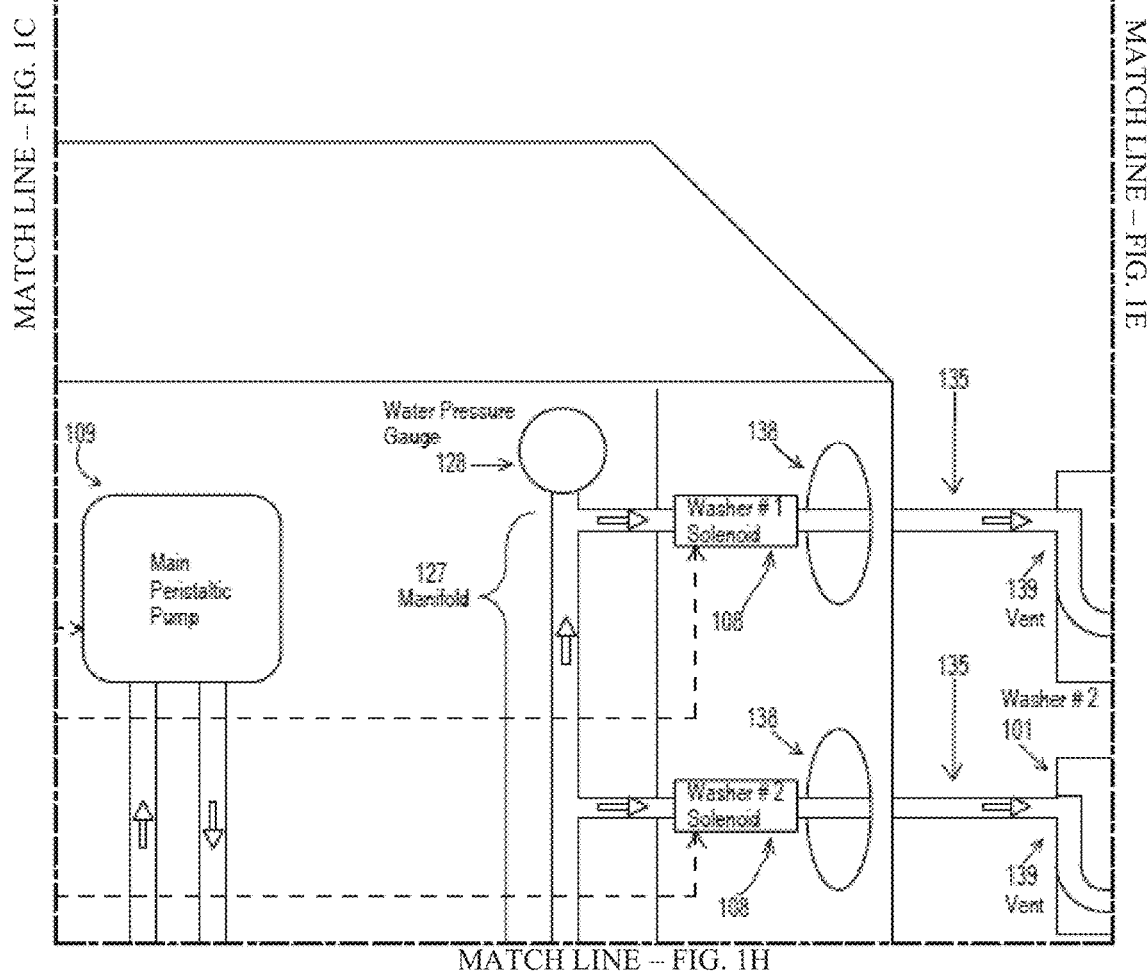
FIG. 1D: EXEMPLARY OPERATIONAL SCHEMATIC SECTION 1D.

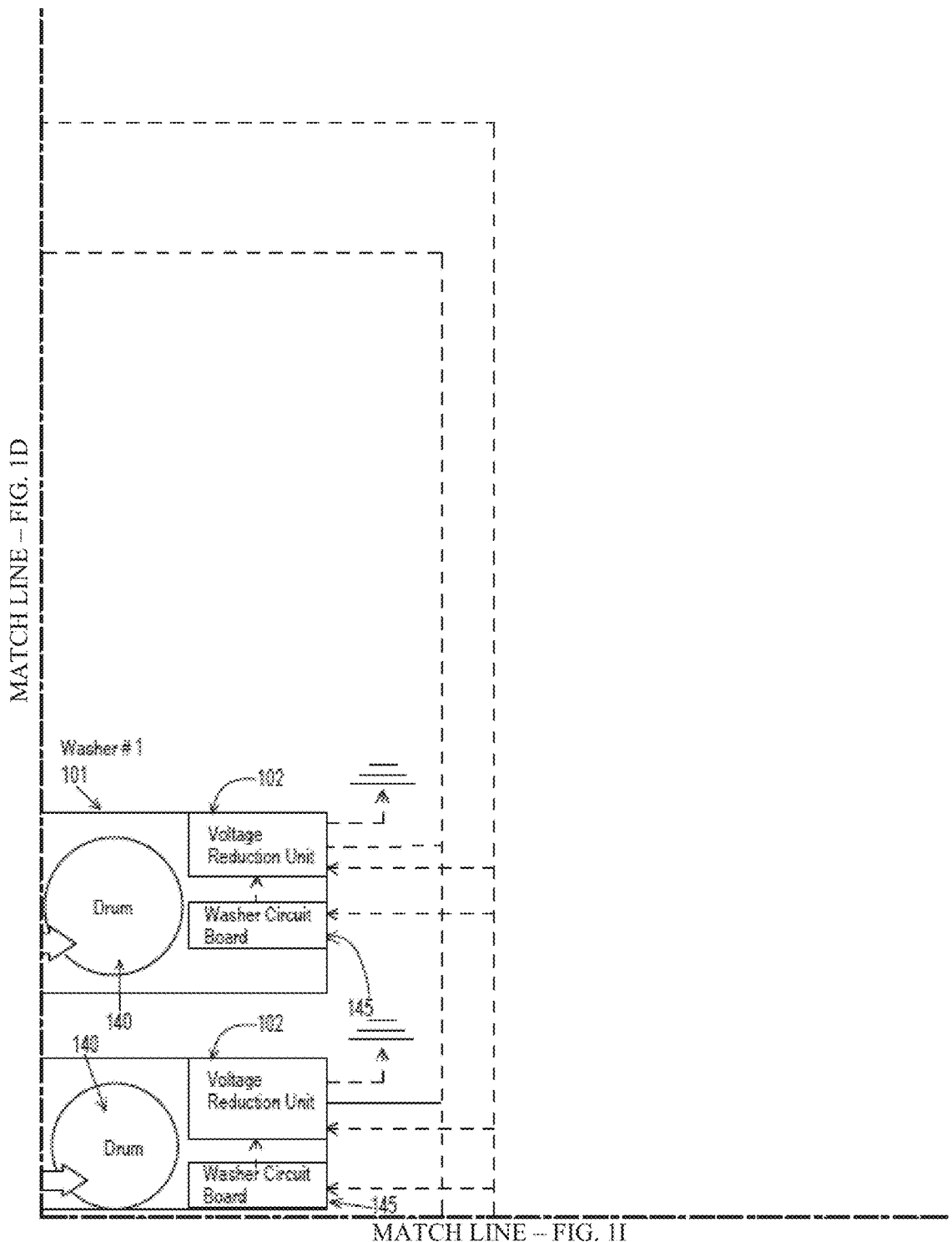
FIG. 1E: EXEMPLARY OPERATIONAL SCHEMATIC SECTION 1E.

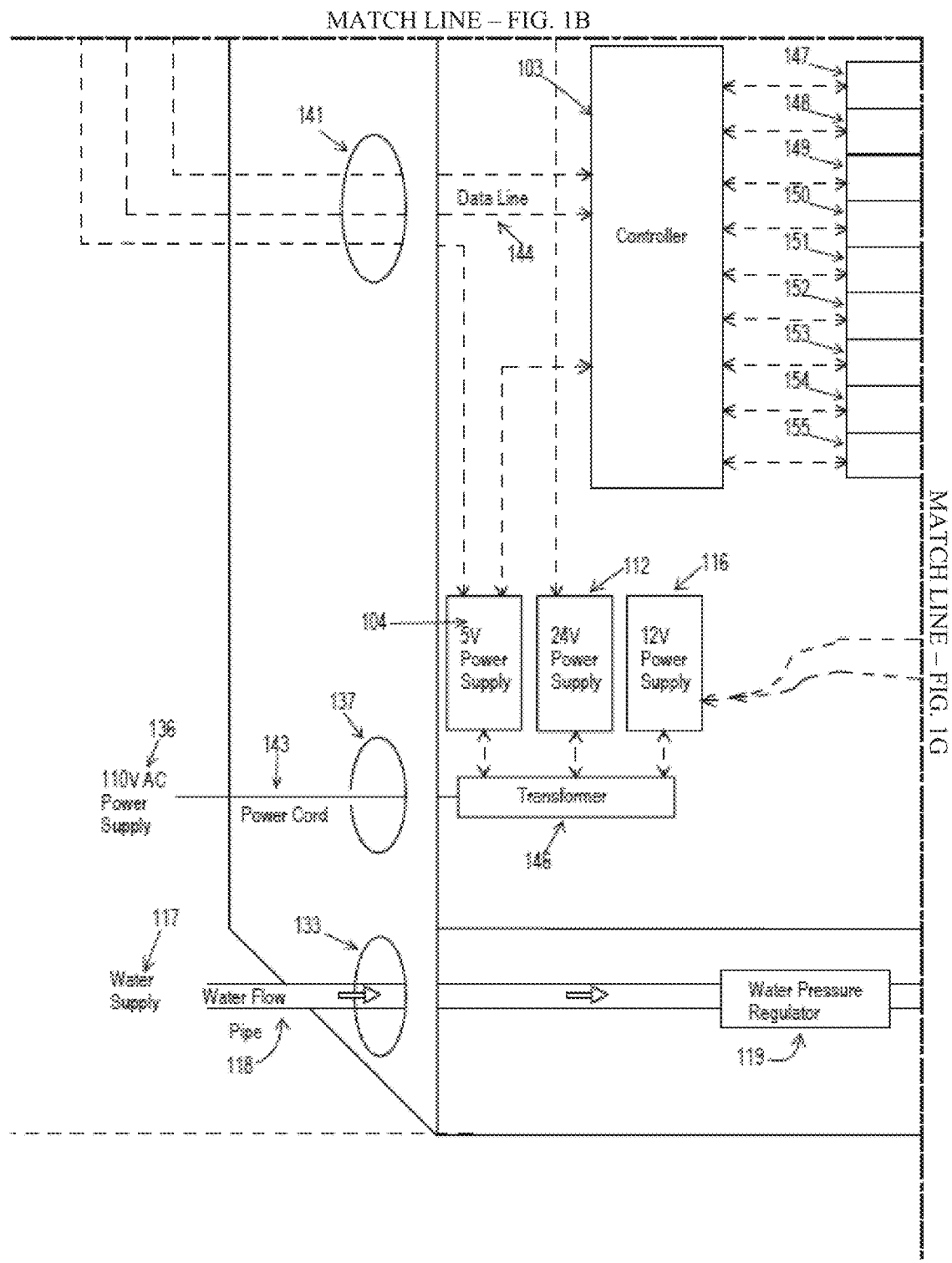
FIG. 1F: EXEMPLARY OPERATIONAL SCHEMATIC SECTION 1F.

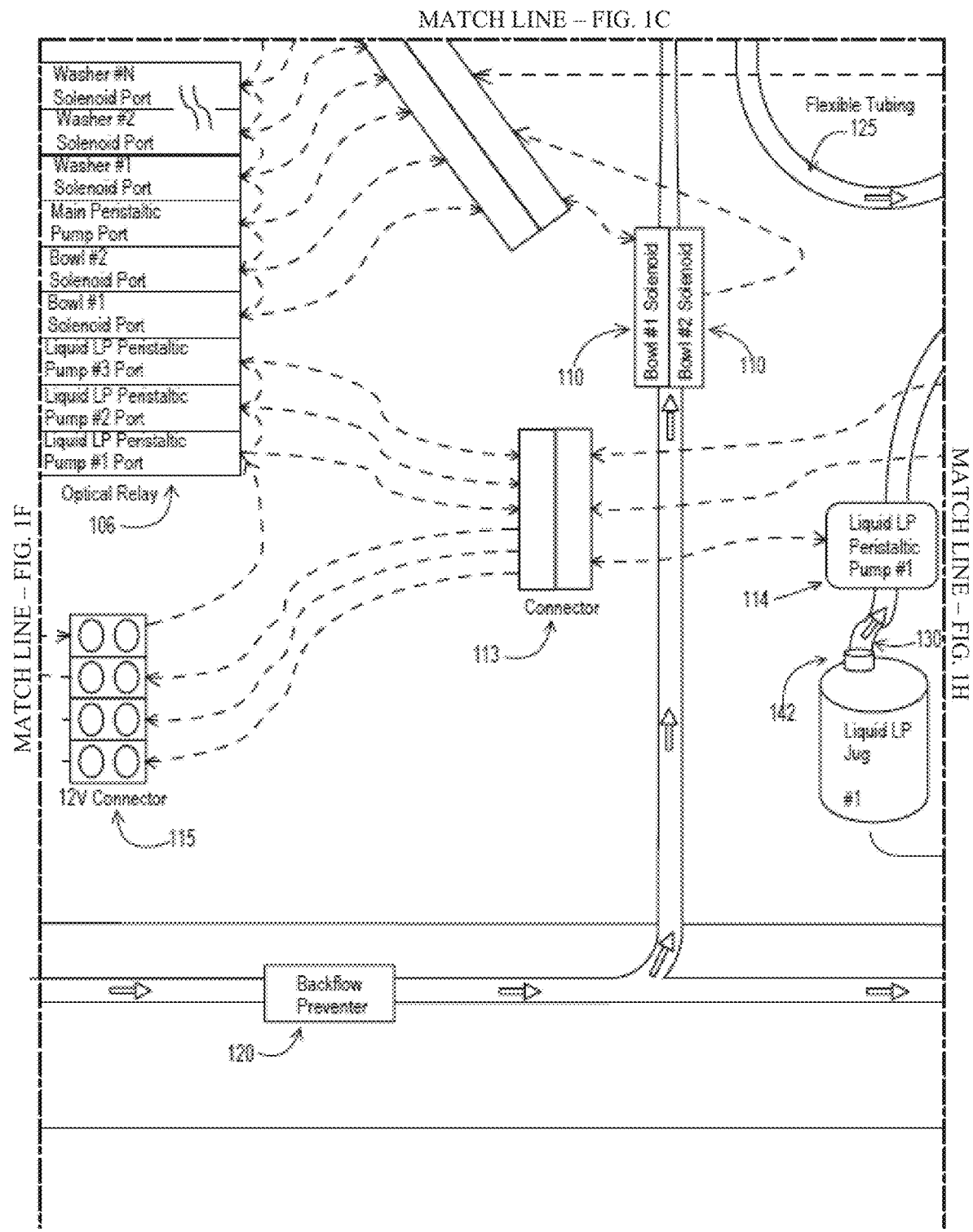
FIG. 1G: EXEMPLARY OPERATIONAL SCHEMATIC SECTION 1G.

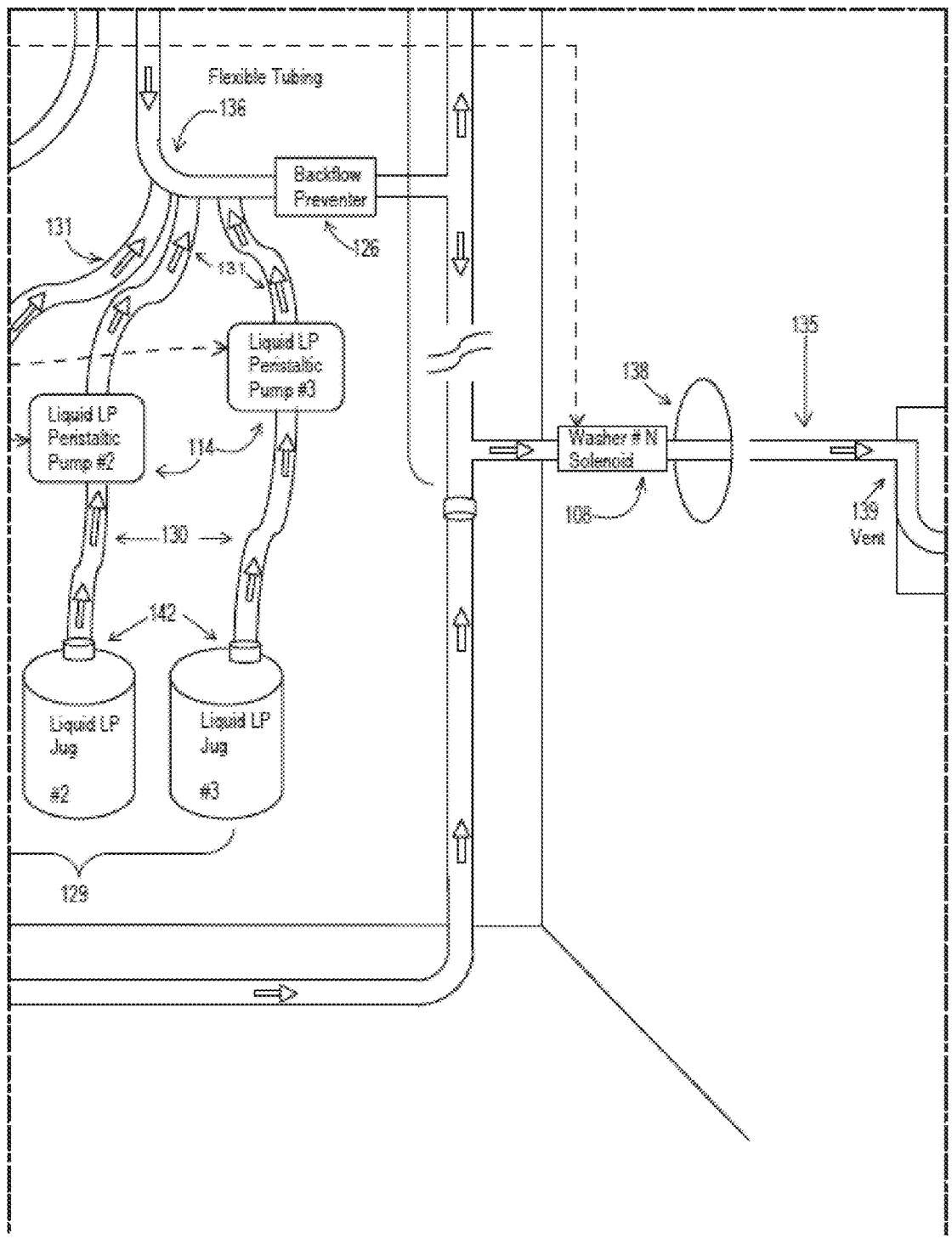
FIG. 1H: EXEMPLARY OPERATIONAL SCHEMATIC SECTION 1H.

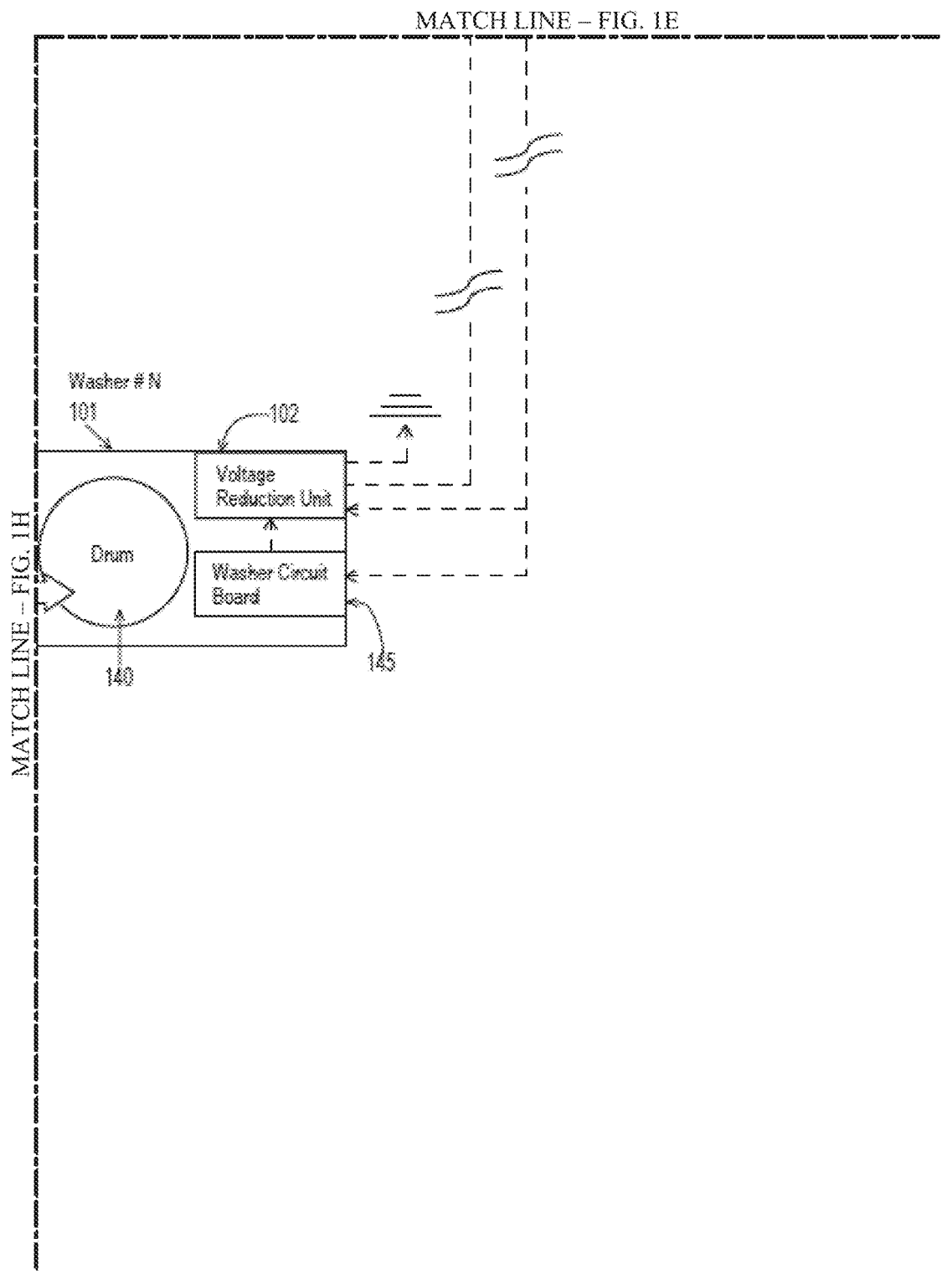
FIG. 1I: EXEMPLARY OPERATIONAL SCHEMATIC SECTION 1I.

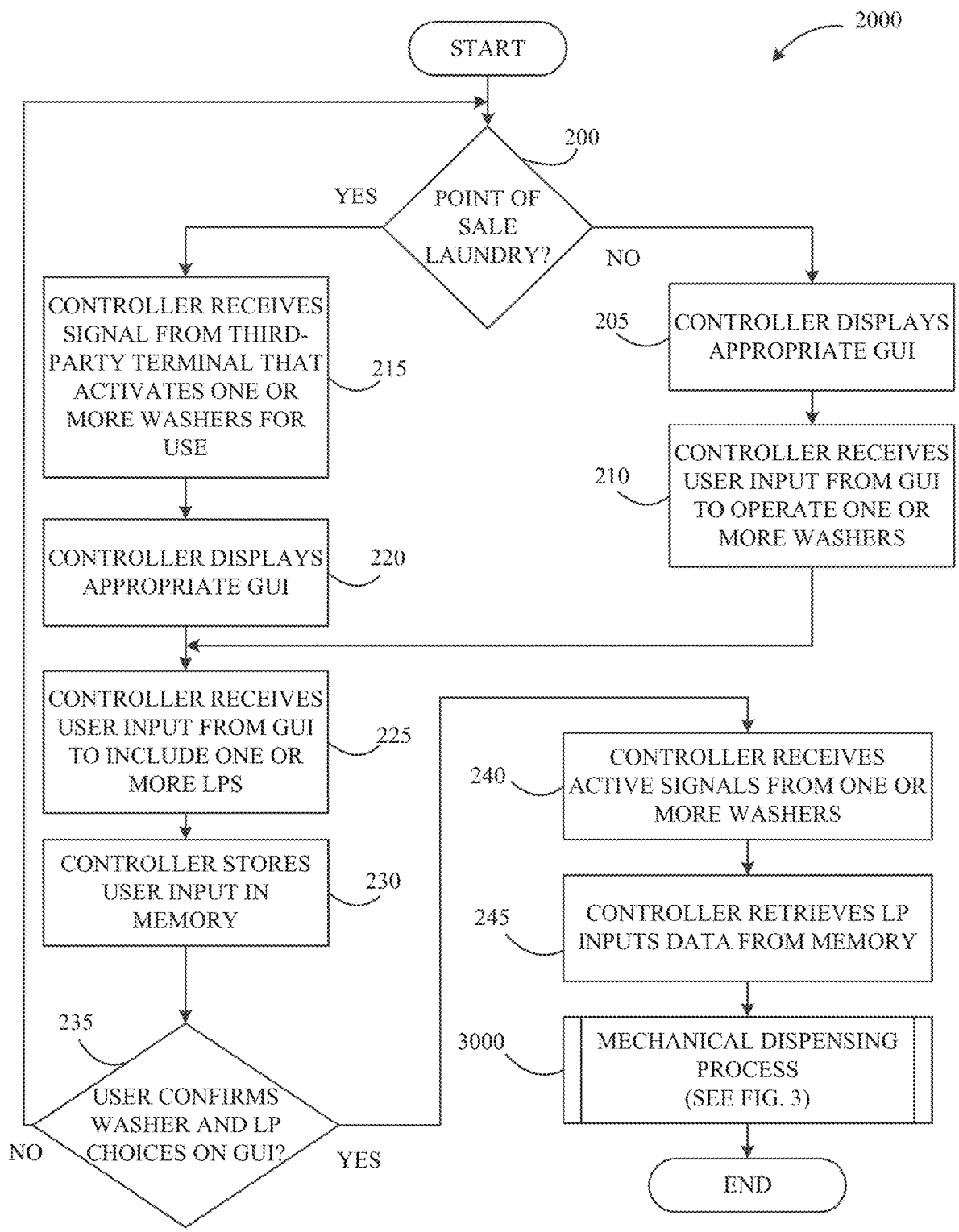
FIG. 2: EXEMPLARY SYSTEM CONFIGURATION PROCESS.

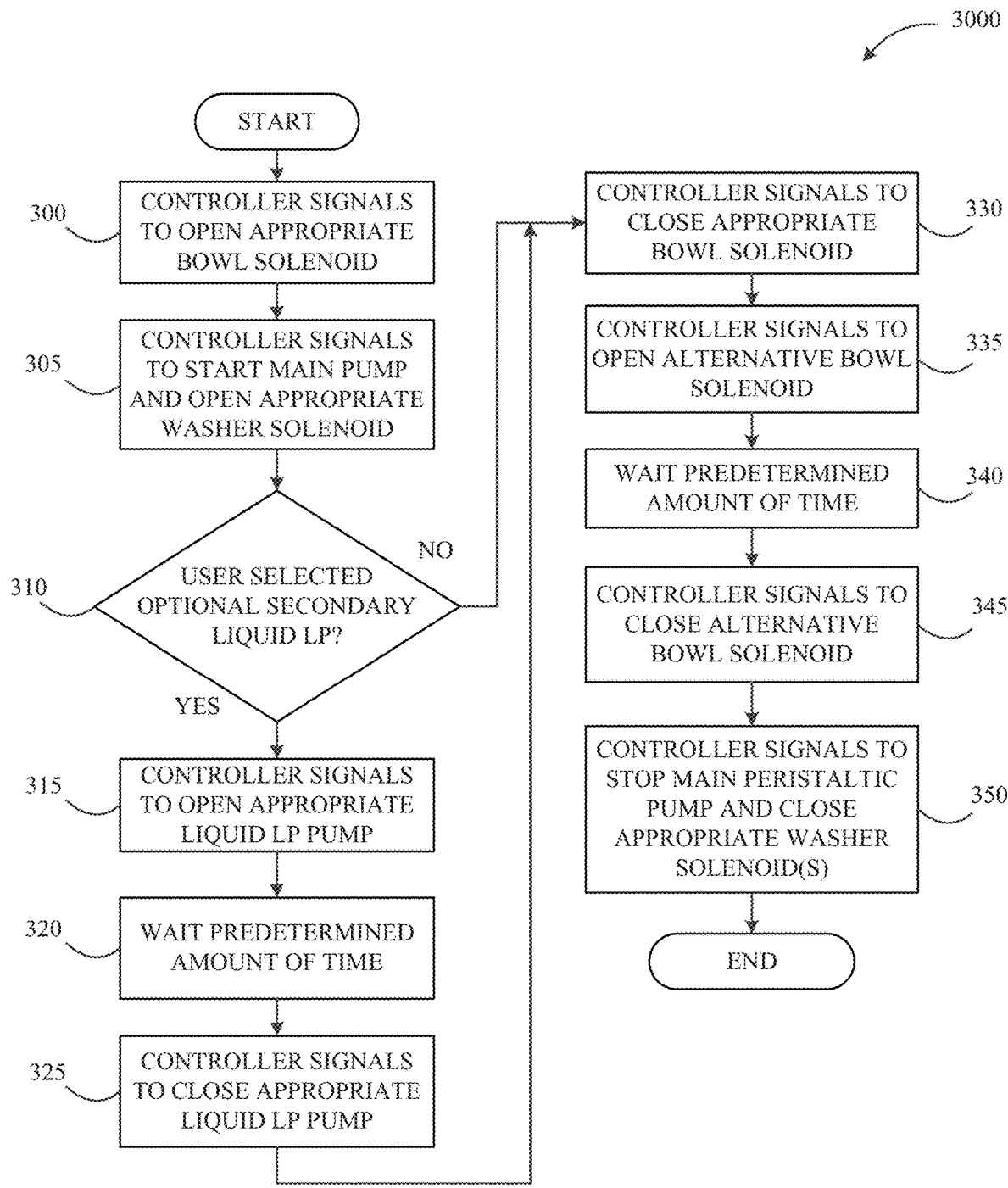
FIG. 3: EXEMPLARY MECHANICAL DISPENSING PROCESS.

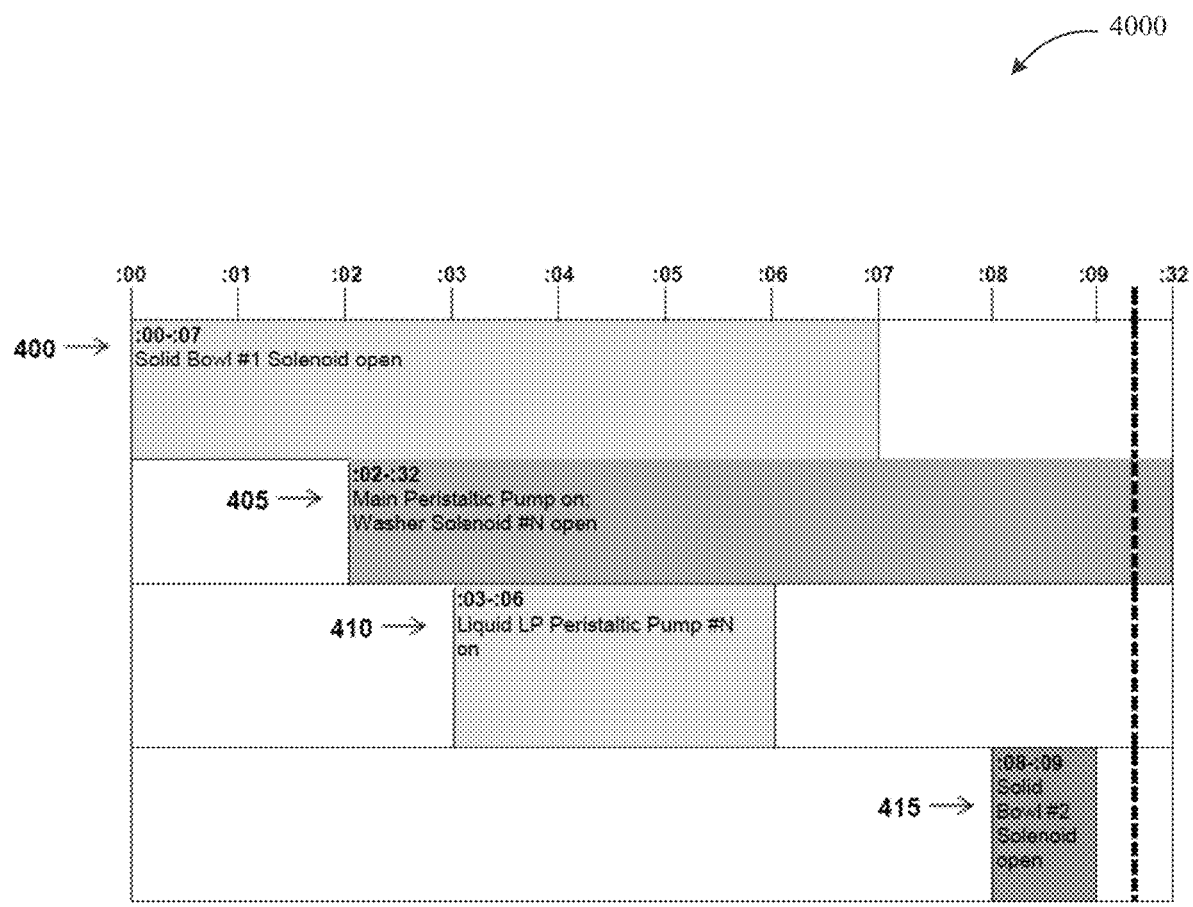
FIG. 4: EXEMPLARY SYSTEM OPERATION SEQUENCE DIAGRAM.

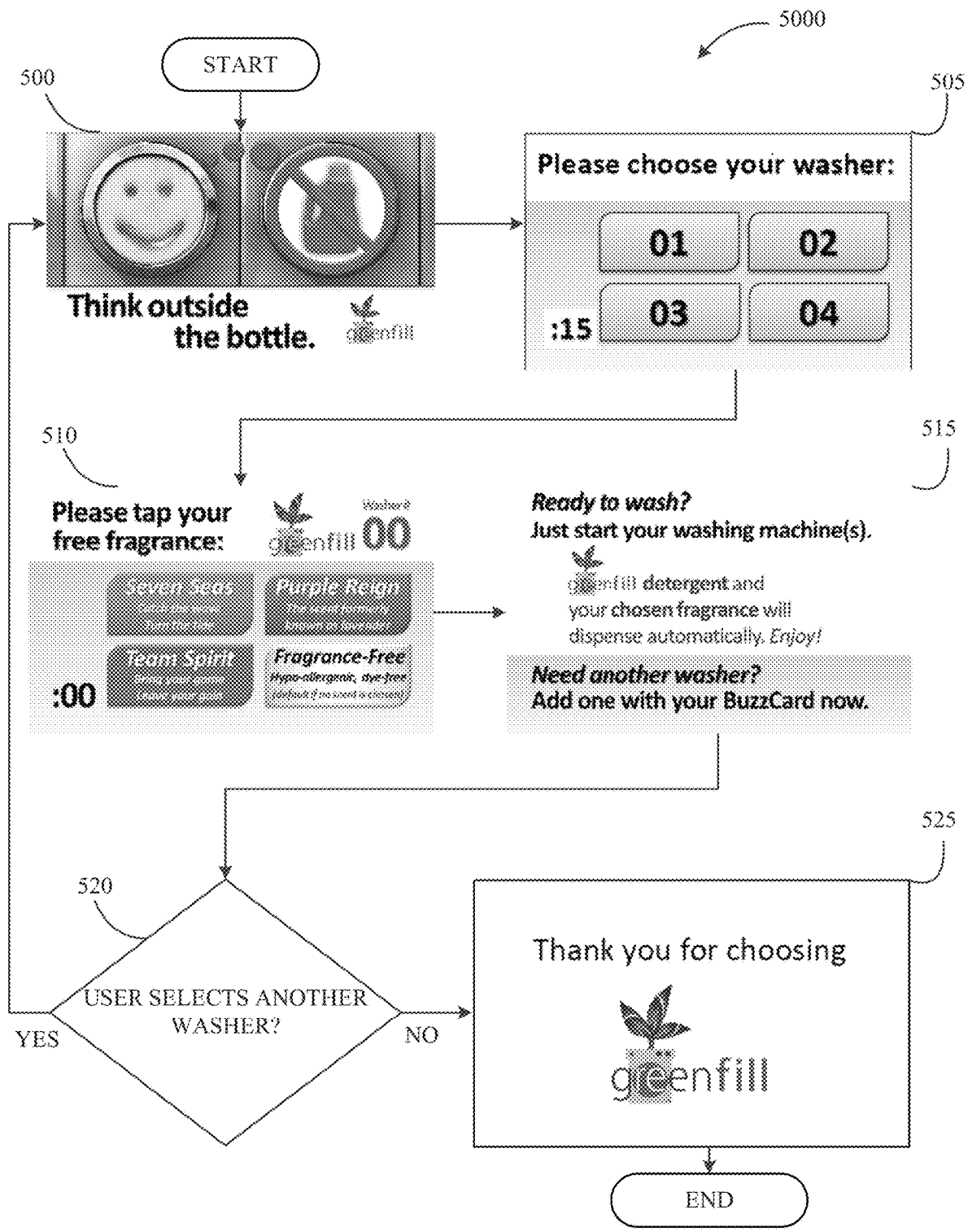
FIG. 5: EXEMPLARY GUI PROCESS FLOWCHART.

SYSTEMS, METHODS, AND APPARATUSES FOR MANAGING THE MIXTURE AND DELIVERY OF A PLURALITY OF LAUNDRY PRODUCTS TO A PLURALITY OF WASHING MACHINES

CROSS REFERENCE TO RELATED APPLICATIONS

This application claims priority to, the benefit under 35 U.S.C. § 119 of, and incorporates by reference herein in its entirety, U.S. Provisional Patent Application No. 62/286,361, filed Jan. 23, 2016, and entitled "System and Method for Dispensing Laundry Products into Multiple Retail and Residential Washing Machines."

TECHNICAL FIELD

The present disclosure relates to systems, methods, and apparatuses for utilizing a graphical user interface, a controller, solenoids, peristaltic pumps and a flush manifold to automatically dispense one or more users' choices of one or more laundry chemicals, including fragrances, to one or more washing machines.

BACKGROUND

Consumers frequently purchase laundry products (referred to herein as "LPs") including non-limiting examples such as detergents, fabric softeners, bleaches, etc., to use in laundry washing machines in retail and/or residential laundry (referred herein to as "RRL") locations such as laundromats, homes, apartment and condominium communities, hotels, military barracks, school dormitories, etc. This arrangement is often problematic for RRL users and operators.

LPs are commonly sold in containers designed to service multiple loads of laundry, often as many as 36 loads or more. These LPs have specific properties included in their formulation, including fragrances or the lack of fragrances ("fragrance-free"). It follows that after a user purchases a container of LP, every load of clothes the user washes with this product must encounter its specific properties. A shortcoming of this arrangement is users cannot choose custom blends of properties, to select and/or deselect which properties they want, including fragrances, for each individual load of clothes they wash.

RRL users may have to follow many steps that include: purchase the container of LP; store the container when not in use; remember to bring the container to the washing machine location (and make a return trip to retrieve the container if they forget it); carry the often heavy container from its storage location to the washing machine location; determine the desired amount of LP to put into the washing machine(s); put the product into the washing machine(s); carry the container back to its storage location; and when the container is empty, either discard, reuse, or recycle it. This process can be time consuming and inconvenient for users, including the requirement that they be physically present in the RRL facility to use their LPs.

It has been estimated that about fifty percent of Americans use fifty percent more laundry detergent than they need. This averages to about 25% oversoaping per user. In part this is because LPs are often difficult to dose correctly. Many users fill an entire soap tray to the top, even for small loads. Some users use single-dose pods; however they often use more than one at a time. Inexperienced laundry machine users have been reported to pour dish detergent into their washers.

Oversoaping harms RRL businesses. Too much detergent causes washing machines to overflow and break down. That means increased washer downtime, increased service calls, and costly clean up. This may translate to unhappy customers, higher operational costs and therefore lower profits.

Oversoaping harms the environment. Excess LP use may create strain on water treatment plants and sewage systems, and as well as excess water usage. To compensate for rampant oversoaping, many RRL facilities use a "pre-wash" cycle—which can be 14 gallons of water—in order to clear out the extra soap used by the previous user. That means for a typical four-cycle wash, oversoaping wastes about 25% more water per load. Some High Efficiency (referred to herein as "HE") washers are designed to use less water and less soap, although these washers are even more susceptible to damage from oversoaping. Unfortunately this has led some facilities to no longer use HE machines.

Oversoaping also promotes the proliferation of containers of laundry products, which are typically plastic. The unnecessary production of these containers may negatively affect the environment in several ways: manufacturing and filling detergent containers requires energy and produces fuel emissions; shipping detergent containers from manufacturers to retailers requires energy and produces fuel emissions; users overfilling detergent sends excess detergent down drains, negatively affecting water quality; discarding empty detergent containers adds to landfill mass; and although recycling is a more environmentally friendly choice, recycling empty detergent containers has both an environmental and a financial cost. Therefore, there is a long-felt but unresolved need for systems and methods designed to combine sophisticated software and hardware in order to deliver one or more laundry products to a plurality of washing machines.

BRIEF SUMMARY OF THE DISCLOSURE

Briefly described, the present disclosure relates to systems, methods, and apparatuses that allow a plurality of users to use a GUI to select a plurality of LPs to be dispensed directly into a plurality of washers for RRL applications. If used in a laundry application that does not require a point of sale payment (commonly called "free play"), the process begins when the system receives input from a user through the GUI (or other input means, such as voice activation, gesturing, mobile phone app, etc.) to select a washer for use. If used in a pay-to-operate laundry application, the process begins when the system detects a signal from a user payment terminal to the circuit board of a washer, which activates that washer for use. In either case, the system may receive through the GUI a user's inputted request to dispense one or more LPs into the specified washer, store the user selections in a memory queue, and reset the GUI to allow more user selections for another washer. When a user starts their selected washer, the system: detects the start of the washer; retrieves the user's LP selection data for that washer from the memory queue; activates a solenoid (or other activation mechanism) to dispense tap water into the dispenser bowl(s) of the selected primary LPs; activates a peristaltic pump to pump the selected secondary LPs, if any, to a manifold; activates a solenoid at the manifold corresponding to the specified washer; and activates a peristaltic pump to pump all of the selected LPs through the manifold to the specified washer, and to flush the manifold and line to that washer to clear any potentially incompatible LPs for the next use. The system also provides maintenance users secure access to back office menus through a maintenance GUI to configure the dispenser system settings.

In one embodiment, a system for dispensing laundry products into a plurality of washing machines is disclosed. The system comprises: a control system programmed to transmit and receive commands; a fluid passageway connected to a water supply and a plurality of washing machines; a first laundry product source connected to the fluid passageway; a first flow regulation device that controls the introduction of the first laundry product into the fluid passageway; a second laundry product source connected to the fluid passageway; a second flow regulation device that controls the introduction of the second laundry product into the fluid passageway; and a third flow regulation device associated with a particular washing machine. In various embodiments, the third flow regulation device enables the flow of water, the first laundry product, and the second laundry product to the particular washing machine. In particular embodiments, the control system is operatively coupled to and transmits commands to open the first flow regulation device, the second flow regulation device, and the third flow regulation device. In certain embodiments, the commands transmitted from the controller enable water, the first laundry product, and the second laundry product to flow into the particular washing machine via the fluid passageway.

In various embodiments, the first laundry product source comprises a container having solid laundry soap therein. In certain embodiments, the first laundry product source is positioned vertically above a catch bowl and adapted to receive a water spray from the fluid passageway. In one embodiment, a water and soap mixture is created and delivered back into the fluid passageway.

In various embodiments, the first laundry product comprises soap. In some embodiments, the second laundry product comprises a fabric softener, a fragrance, or bleach. In particular embodiments, each flow regulation device comprises a valve solenoid and/or a peristaltic pump. According to various aspects of the present disclosure, the first laundry product and the second laundry product are different.

In one embodiment, the third flow regulation device comprises a valve solenoid positioned in the fluid passageway immediately prior to the particular washing machine. In certain embodiments, the third flow regulation device may control the flow of fluid to the particular washing machine. In some embodiments, the flow regulation devices are pre-programmed to open and maintain open at different times in a predetermined order. In a particular embodiment, a display device is connected to the control system which allows for a user to input instructions regarding laundry products and washing machine selections.

In one embodiment, a method for dispensing laundry products into a plurality of washing machines is disclosed. In various embodiments, the method comprises the steps of: receiving selection of a particular washing machine in the plurality of washing machines for use, selection of a first laundry product to be introduced into the particular washing machine, and selection of a second laundry product to be introduced into the particular washing machine, each selection received via a control system. In various embodiments, the method further comprises the steps of: receiving a signal at the control system indicating that the particular washing machine has been activated for use; transmitting a signal from the control system to a first flow regulation device associated with the first laundry product to allow for the introduction of the first laundry product into a fluid passageway connected to the particular washing machine for a first predetermined period of time; transmitting a signal from the control system to a second flow regulation device associated with the second laundry product to allow for the introduction of the second laundry product into the fluid passageway connected to the particular washing machine for a second predetermined period of time; and transmitting a signal from the control system to a third flow regulation device that controls the flow of fluid to the particular washing machine. In one embodiment, the signal causes the third flow regulation device to allow the first laundry product and the second laundry product to flow through the fluid passageway into the particular washing machine.

In certain embodiments, the signals from the control system to the first, second, and third flow regulation devices are transmitted in a predetermined order at predetermined times according to one or more predetermined rules. Further, in particular embodiments, the selections of washing machines and laundry products are each stored in local memory in the control system until the signal is received at the control system indicating that the particular washing machine has been activated for use. According to various aspects of the present disclosure, the method further comprises the step of flushing the fluid passageway with water after the laundry products flow through the fluid passageway into the particular washing machine.

In some embodiments, the first laundry product comprises soap and the second laundry product comprises a fabric softener, a fragrance, or bleach. In various embodiments, the first laundry product and the second laundry product of the method are different.

According to one embodiment, a system is disclosed comprising a display for receiving instructions from a user. In various embodiments, the display is in connection with dispensing laundry products into a plurality of washing machines. The system further comprises a control system operatively connected to the display. According to various aspects of the present disclosure the control system is programmed to transmit and receive commands. The system also comprises a fluid passageway adapted to facilitate the flow of water and a plurality of laundry products through the system to the plurality of washing machines.

In various embodiments, the system further comprises a plurality of controllable bowl solenoids each operatively connected to the control system. In one embodiment, each bowl solenoid is associated with a respective first laundry product source containing a first laundry product type and operative to facilitate the water flow through the respective bowl solenoid upon receipt of a corresponding command from the control system. In certain embodiments, the water flow mixes with the first laundry product type and collects in a bowl to create a first laundry product type mixture, whereby the first laundry product type mixture is introduced into the fluid passageway.

The system further comprises, according to various aspects of the present disclosure, a plurality of controllable peristaltic pumps. In one embodiment, the controllable peristaltic pumps are operatively connected to the control system and associated with a respective second laundry product source containing a second laundry product type and operative to facilitate introduction of the second laundry product type into the fluid passageway upon receipt of a corresponding command from the control system. In various embodiments, a plurality of controllable washer solenoids are each operatively connected to the control system. In certain embodiments, each washer solenoid is associated with a respective washing machine of the plurality of washing machines and facilitates the transmission of the water flow, the first laundry product type mixture, and the second laundry product through the fluid passageway into the respective washing machine upon receipt of a corresponding command from the control system.

According to various aspects of the present disclosure, the system further comprises a third-party payment terminal. In one embodiment, the third-party payment terminal is connected to the display and the control system and accepts financial payment prior to dispensing laundry products into a plurality of washing machines. In some embodiments, the first laundry product type and second laundry product type are different.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF FIGURES

FIG. 1A is an exemplary operational schematic of the present systems, methods, and apparatuses, according to one embodiment of the present disclosure.

FIGS. 1B-1I are magnified sections of the exemplary operational schematic of FIG. 1A, according to one embodiment of the present disclosure.

FIG. 2 is a flow chart of the exemplary system configuration process, according to one embodiment of the present disclosure.

FIG. 3 is a flow chart of the exemplary mechanical dispensing process, according to one embodiment of the present disclosure.

FIG. 4 is a sequence diagram illustrating the timing of various exemplary system operations, according to one embodiment of the present disclosure.

FIG. 5 is a flowchart illustrating an exemplary GUI process, according to one embodiment of the present disclosure.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Briefly described, the present disclosure relates to systems, methods, and apparatuses that allow a plurality of users to use a GUI to select a plurality of LPs to be dispensed directly into a plurality of washers for RRL applications. If used in a laundry application that does not require a point of sale payment (commonly called "free play"), the process begins when the system receives input from a user through the GUI (or other input means, such as voice activation, gesturing, mobile phone app, etc.) to select a washer for use. If used in a pay-to-operate laundry application, the process begins when the system detects a signal from a user payment terminal to the circuit board of a washer, which activates that washer for use. In either case, the system may receive through the GUI a user's inputted request to dispense one or more LPs into the specified washer, store the user selections in a memory queue, and reset the GUI to allow more user selections for another washer. When a user starts their selected washer, the system: detects the start of the washer; retrieves the user's LP selection data for that washer from the memory queue; activates a solenoid (or other activation mechanism) to dispense tap water into the dispenser bowl(s) of the selected primary LPs; activates a peristaltic pump to pump the selected secondary LPs, if any, to a manifold; activates a solenoid at the manifold corresponding to the specified washer; and activates a peristaltic pump to pump all of the selected LPs through the manifold to the specified washer, and to flush the manifold and line to that washer to clear any potentially incompatible LPs for the next use. The system also provides maintenance users secure access to back office menus through a maintenance GUI to configure the dispenser system settings.

One embodiment of the present disclosure generally relates to a laundry dispensing system that automatically dispenses precise doses and mixtures of LPs into one or more washers.

In particular embodiments, the system is optimized for RRL locations, offering RRL users a more convenient laundry experience by allowing them to select from a plurality of LPs to be dispensed on-demand for every load of laundry, no longer constrained by the specific formula or fragrance of a 36-use bottle of detergent or the like.

In various embodiments, the system reduces the hassles and workload for RRL users, by eliminating their need to purchase, store, remember, carry, discard, reuse and/or recycle single-use laundry detergent containers, and to measure and pour detergents.

According to various aspects of the present disclosure, the system ensures consistently precise LP dosages, dispensing exactly the correct amount of product to get linens clean but not damage washers and waste chemicals. This improves laundry operation environmental sustainability by removing the need for RRL users to purchase their own containers of laundry products, which are typically plastic. By eliminating the risk of users oversoaping, the environment is benefited by reducing the need to for such containers to be manufactured and shipped, reducing carbon emissions from manufacturing and shipping, and reducing the number of such plastic containers from either being discarded to landfills or recycled into other products, which also requires energy to accomplish.

In various embodiments, an RRL user operates the system to select the one or more specific washing machines he/she wants to use and the specific primary and optional secondary LPs desired. He/she then loads his/her clothes into the selected washing machine and starts the washing cycle. At the appropriate time during the cycle, the system may automatically dispense the correct amount of his/her selected LPs directly into the selected washing machine.

Referring now to the figures, for the purpose of example and explanation of the fundamental processes and components of the disclosed systems, methods, and apparatuses, reference is made to FIG. 1A, which illustrates an exemplary, high-level overview of one embodiment of a system 1000 in accordance with various aspects of the present disclosure. For the purpose of clarity and ease of review, FIGS. 1B-1I are magnified sections of FIG. 1A, and the match lines included on each of FIGS. 1B-1I indicate how the figures are interrelated. In one embodiment, the system comprises one or more flow regulation devices, including equipment such as but not limited to solenoids 110 and 108, pumping mechanisms 109 and 114, flow regulators 119, 120, and 126, manifolds 127, and other mechanical hardware to facilitate the flow of water and LPs throughout the system. In particular embodiments, the one or more flow regulation devices facilitate the flow of fluids (e.g., water) and LPs through a fluid passageway. In some embodiments, the fluid passageway includes the combination of water pipes 118, flexible tubing 121, 125, and 136, and manifolds 127 used to direct fluid to one or more washers 101 in the system. In various embodiments, the mechanical hardware included in the system is coupled with electrical hardware such as but not limited to a plurality of voltage supplies 104, 112, and 116, transformers 146, electrical component connectors 111, 115, 107, and 113, and a controller 103 (also referred to herein as a "control system") operative to send and receive electrical signals between the various electrical and mechanical components.

In particular embodiments, a user may configure the system by means of a monitor 105 and/or a third-party payment terminal 100. In one embodiment, various components within the system receive electrical signals from the monitor 105 and/or the third-party payment terminal 100 which may result in the initiation of one or more washers 101 or the mixture of one or more LPs. According to various aspects of the present disclosure, the monitor 105 may be controllable by a touch screen, point-and-click mouse, voice commands, body gestures, a mobile phone or other electronic computing device, etc. In some embodiments, the third-party payment terminal 100 may be integrated into a mobile phone app, a remote computing device, or another digital system.

In various embodiments, monitors 105 may be located in close proximity to RRL facility, in a remote location, or available on a mobile computing device. In non-limiting examples, monitors 105 may be located on walls, tables, counters, kiosks, on washing machines 101, on a cabinet 132, or some other location within the laundry facility area. In various embodiments, the cabinet 132 is any housing of the system. In some embodiments, there may be more than one cabinet 132 for a particular system depending on the system configuration and laundry facility area needs. In one embodiment, the cabinet 132 is mounted on a wall in the laundry facility, or located on the floor, in a service closet, or some other location within the laundry facility area. From within the cabinet 132, the controller 103 may send and receive digital input to and from the monitor 105. In particular embodiments, the cabinet 132 may include an opening 141 wherein a data line 144 may pass through and connect the controller 103 to the monitor 105 and/or third-party payment terminal 100. In some embodiments, the monitor 105 and third-party payment terminal 100 may wirelessly communicate with the controller 103 by means of Bluetooth, Wi-Fi, a local area network (LAN), or another appropriate method of wireless communication. According to various embodiments, RRL users may operate monitors 105 virtually via computer, tablet, smart phone or other digital device. Thus, RRL users may have the convenience of operating the system from a variety of locations. In some embodiments, one or more of the electrical signals sent throughout the system could be transmitted wirelessly.

In one embodiment, the system is connected to a plurality of the laundry facility's washers 101. In various embodiments, a voltage reduction unit ("VRU") 102 is connected to a circuit board 145 within each of the plurality of washers 101. In some embodiments, the VRUs 102 are in turn each wired to the system's controller 103 through an opening 141 in the cabinet 132. In various embodiments, the VRUs 102 are configured to manage voltage and power levels within the system in order to ensure that the plurality of washers 101, as well as the other system hardware, is appropriated powered.

In some embodiments, the RRL facility may use a point of sale business model. In particular embodiments, a point of sale facility allows for a user to pay per use of the one or more washers 101. In such an embodiment, a RRL user may use a third-party payment terminal 100 to select the washer 101 he/she wants to use and to make any required payment using cash, credit card, debit card, etc. In one embodiment, the third-party payment terminal 100 is wired to the circuit board 145 of the selected washer 101, as well as the system's VRU 102, which is connected to the washer's circuit board 145 as well as the controller 103. In some embodiments, the third-party terminal 100 may be integrated into a mobile phone app, or another appropriate software application thereby allowing wireless financial transactions.

According to various aspects of the present disclosure, a 110V AC power supply 136 may provide the necessary power to the system. In one embodiment, the facility's 110V AC power supply 136 provides power via a power cord 143. In some embodiments, the cabinet 132 may include an opening 137 for the power cord 143 to pass through and connect with the transformer 146. In certain embodiments, the transformer may power the 5V power supply 104, the 12V power supply 116, and the 24V power supply 112. In various embodiments, both the controller 103 and monitor 105 are powered by the 5V power supply 104. In certain embodiments, the monitor 105 is wired to the 5V power supply 104 through the opening 141 in the cabinet 132.

In one embodiment, the system includes an optical relay 106 for switching and controlling electronic signals. In various embodiments, within the cabinet 132 the controller 103 is connected to the optical relay 106. According to various aspects of the present disclosure, the optical relay 106 may be powered by the 24V power supply 112 via a 24V connector 111. In one embodiment, this is achieved through a "daisy-chain" wiring arrangement, so that the power from the 24V connector 111 is distributed via a connection to the optical relay's 106 port connected to the washer solenoid 147 (the solenoid port of the $N^{th}$ washing machine included in the plurality of washing machines 101). In particular embodiments, the washer solenoid port 147 in turn is wired to its next adjacent port, which for the purpose of simplicity is shown as washer #2 solenoid port 148. This wiring pattern may continue in the same way to the washer #1 solenoid port 149, then the main peristaltic pump port 150, then the bowl #2 solenoid port 151, and finally to the bowl #1 solenoid port 152. In particular embodiments, all of these ports are also wired to connector 107. In one embodiment, the connector 107 then connects to two bowl solenoids 110, the main peristaltic pump 109, and all washer solenoids 108.

In one embodiment, and on the other end of the optical relay 106, using the same daisy-chain arrangement, the power from the 12V power supply 116 may be distributed through the 12V connector 115 via a connection to the liquid LP peristaltic pump #1 port 155, then its next adjacent port, the liquid LP peristaltic pump #2 port 154, and finally to the liquid LP peristaltic pump #3 port 153. In various embodiments, each of these ports is also wired to connector 113, which then connects to the three liquid LP peristaltic pumps 114.

Continuing with FIG. 1A, and as shown in the present embodiment, the present system includes a fluid passageway described in further detail below. On one embodiment, the fluid passageway begins at an opening 133 in the cabinet 132, wherein a pipe 118 connected to a water supply 117 passes through and connects with the system. In one embodiment, this pipe 118 leads first to a water pressure regulator 119 and then a backflow preventer 120. In various embodiments, the pipe 118 then splits off in at least two directions. In various embodiments, one direction may connect to a manifold 127, to be described below. In particular embodiments, another direction may connect to the two bowl solenoids 110, which serve as gateways into two corresponding lines of flexible tubing 121. In one embodiment, these lines of flexible tubing 121 each lead upward alongside two bowls 124. In certain embodiments, each line of flexible tubing 121 then turns downward into its corresponding bowl 124, and then at the bottom of the bowl 124 points back upward, so they each terminate at a spray jet 122. In one embodiment, these bowls 124 are located at the top of the cabinet 132, so that the basins of the bowls 124 are exposed through two openings 134. According to various aspects of the present disclosure, two interchangeable jars of solid LP 123 are seated in the bowls 124 upside down, with their lids removed, and positioned directly above the spray jets 122. (According to some embodiments, there may be more than two jars of solid LP 123 and their corresponding bowl solenoids 110, lines of flexible tubing 121, bowls 124 and spray jets 122.) In particular embodiments, when the bowl solenoids 110 are opened and release water into these spray jets 122, the water splashes against the exposed solid LP, constituting a liquid mix of water and LP, which drains down into the bowls 124 to a common line of flexible tubing 125. In one embodiment, this flexible tubing 125 then ascends to connect into the main peristaltic pump 109. In various embodiments, another line of flexible tubing 136 descends out from the peristaltic pump 109 and connects to a backflow preventer 126.

In various embodiments, the system includes a plurality of liquid LP peristaltic pumps 114. In one embodiment, the flexible tubing 136 described immediately above may connect with a plurality of other lines of flexible tubing 131, each of which connects to a liquid LP peristaltic pump 114. In various embodiments, each pump 114 connects to another line of flexible tubing 130, which in turn connects via a closed loop cap 142 to one of three jugs of liquid LP 129. Therefore the contents within each of the three jugs 129 may be pumped by their corresponding liquid LP peristaltic pumps 114 to join the mix of water and dissolved solid LP from the bowls 124 in the flexible tubing 136. (According to some embodiments, there may be more than three jugs of liquid LP 129 and associated liquid LP peristaltic pumps 114 and lines of flexible tubing 130.) In one embodiment, the pressure from the main peristaltic pump 109 will then direct this combined liquid mix through the backflow preventer 126, which in turn connects to the manifold 127.

In various embodiments, the manifold 127 is a collection point near the end of the fluid passageway wherein the mixture of fluids and LPs from the system passes through in order to be received at one or more washers 101. In various embodiments, this is the same manifold 127 to which the pipe 118 is connected, as described above. Therefore the at least two paths through which water from the facility's water supply 117 may flow within the system rejoin at the manifold 127. In particular embodiments, attached to the end of the manifold 127 opposite the connection to the pipe 118 is a water pressure gauge 128. In certain embodiments, connected to one or more openings along the side of the manifold 127 are one or more washer solenoids 108, each of which serves as a gateway to a line of flexible tubing 135. According to various aspects of the present disclosure, each of these lines of flexible tubing 135 leads from its washer solenoid 108 out of the cabinet 132 through an opening 138, and connects to its corresponding washer 101 through its vent 139, which in turn drains to its drum 140. In one embodiment, the drums 140 are the final destinations of the LPs dispensed by the system.

Continuing with FIG. 1A and according to one embodiment, the system services a "free play" laundry facility. In one embodiment, the "free-play" configuration allows a user to operate the system without first initiating a financial transaction. In various embodiments, the controller 103 displays on the monitor 105 a touch-screen GUI featuring a plurality of digital media content, including non-limiting examples such as system instructions, product menus, promotional material, third-party sponsored content, etc. In a particular embodiment, the RRL user provides input via this touch-screen GUI to select the specific washer 101 he/she wants to use. In particular embodiments that are not "free-play", a user may be required to complete a financial transaction before activating the one or more washers 101.

In some embodiments, the RRL facility may use a point of sale method in order to activate one or more washers 101. In such an embodiment, a RRL user may use a third-party payment terminal 100 to select the washer 101 he/she wants to use and to make any required payment using cash, credit card, debit card, etc. (Such point of sale functionality would be provided by a third-party system, not detailed herein.) In one embodiment, the third-party payment terminal 100 then sends an input signal to the circuit board 145 of the selected washer 101, activating that washer 101 for use. In various embodiments, the VRU 102 connected to the washer's circuit board 145 also detects this activation signal and passes it to the controller 103. In certain embodiments, the controller 103 then sends digital input to the monitor 105, displaying the aforementioned GUI, featuring non-limiting examples such as system instructions, product menus, etc., corresponding to the specific washer 101 the user has selected and paid to use.

Continuing with FIG. 1A and regardless of the method used to activate the one or more washers 101, the user may provide input via the GUI displayed on the monitor 105 to select the primary solid LP 123 and any optional secondary liquid LPs 129 he/she wants to dispense to the aforementioned selected one or more washers 101. (In some embodiments, the user may use the GUI to select multiple LPs, or a combination of LPs, instead of just a primary LP and secondary LP.) In one embodiment, the controller 103 then stores the user's selection input in a queue in its memory. According to various aspects of the present disclosure, the controller 103 then updates the GUI to display further user instructions for a specific duration, such as a non-limiting example of 15 seconds. In one embodiment, these further user instructions may include non-limiting examples such as instructing the user to either load his/her clothes into his/her selected washer 101 and start the washing cycle, or to add an additional washer 101 selection. In particular embodiments, when the user provides input to select an additional washer 101, or when the display's timed duration expires, the controller 103 updates the GUI on the monitor 105 to display the aforementioned variety of digital media content to receive input for an another LP request for another washer 101, either from the original RRL user or another RRL user.

In some embodiments, the RRL user may use the GUI to select multiple washing machines 101, instead of just one. According to various embodiments, multiple RRL users may operate multiple monitors 105 simultaneously, making multiple washer 101 and LP selections that are sent to the controller 103. In certain embodiments, the controller 103 will store the data associated with the user selection in its memory. In various embodiments, when the user starts a washer 101, the controller 103 retrieves the user selection data for that specific washer 101 and then signals the optical relay 106 to dispense the selected product selections to the specified washer 101. In some embodiments, other user selection data for other washers 101 will wait in the memory queue until the specified washers 101 are started. In particular embodiments, if a washer 101 is started while the system is currently dispensing LP to another washer 101, the controller 103 will prioritize the request on a first-in first out basis, so when the it has completed dispensing for the first washer 101, the controller 103 will begin dispensing for the next, and so on. In various embodiments, the controller 103 will dispense LP to washers 101 based on when they are started, not on when their LP was selected. This means that if a hypothetical user A selects one or more LPs for washer A, but is delayed in loading and starting washer A, while a subsequent user B selects one or more LPs for washer B and starts washer B before washer A is started, then the controller 103 will immediately dispense user B's selected one or more LPs to washer B, and wait to dispense user A's selections until washer A is started. Also, in various embodiments, the time durations of dispensing are short enough to allow the controller 103 to prioritize and sequentially dispense LP to a plurality of washers 101, even if they were all started simultaneously. Thus, RRL users may have the convenience of making LP selections without waiting for another user's washer 101 to finish dispensing.

Still referring to FIG. 1A, in one embodiment, after a user has finished providing input via the GUI to make one or more LP requests, he/she then loads his/her clothes into the selected washer 101 and starts the washing cycle. In various embodiments, the controller 103 detects the input signal indicating the washer 101 has been started, and then retrieves the input selection data for that specific washer 101 from its memory queue. In particular embodiments, the controller 103 then begins the dispensing process for that specific washer 101 by sending a series of signals at specifically timed intervals to the optical relay 106. In certain embodiments, the signals sent by the controller 103 to the optical relay 106 in turn activate a series of sequential mechanical operations that collectively serve to dispense the user's selected one or more LPs to the specified washer 101. According to various aspects of the present disclosure, these timings are calibrated based on a number of facility-specific factors including non-limiting examples such as water supply pressure, water supply temperature, and the distance between cabinet 132 and each individual washer 101.

Now turning to FIG. 2, a flow chart of the exemplary system configuration process 2000 is shown according to one embodiment of the present disclosure. In various embodiments, the exemplary configuration process 2000 involves receiving user input and initiating one or more washers 101 based on the user input. In one embodiment, the process 2000 begins at step 200 where it is determined if the current system activity is a point of sale laundry transaction. In some embodiments, the RRL facility may use a point of sale business model, whereby a user may use a third-party payment terminal 100 to select the one or more washers 101 he/she wants to use and to make any required payment using cash, credit card, debit card, etc. If at step 200 it is determined that the user has initiated a point of sale laundry transaction, then the process proceeds to step 215. In one embodiment, at step 215 the user completes the financial transaction to operate the desired one or more washers 101. In various embodiments, at step 215 the controller 103 receives a signal from the third-party payment terminal 100 indicating that the one or more washers 101 selected by the user have been paid for and are now ready to be used. Further, the controller 103 may activate the one or more washers 101 for use upon receiving a signal from the third-party payment terminal 100 indicating payment completion. After the controller 103 activates the selected one or more washers 101 at step 215, the process 2000 proceeds to step 220 where the controller 103 initiates the display of a GUI on the monitor 105. In one embodiment, initiating the display of a GUI on the monitor 105 allows for the user to further configure the desired LPs to be included in the one or more selected and activated washers 101.

Continuing with process 2000, if at step 200 it was determined that the current system activity was not a point of sale laundry transaction, the process 2000 would then proceed to step 205. In one embodiment, at step 205 the controller 103 initiates the display of a GUI on the monitor 105. In various embodiments, the GUI may allow the user to select one or more washers 101 for use. Further, the GUI may allow for the user to select one or more LPs to be included in the selected one or more washers 101.

At step 210, and according to various aspects of the present disclosure, the controller 103 may receive the user input from the GUI displayed at step 205. In one embodiment, the user input received at step 210 includes the desired one or more washers 101 to be used. In one embodiment, after both steps 210 and/or 220, the process 2000 proceeds to step 225 where the controller 103 receives the user input from the GUI presented at steps 205 and/or 220 wherein the user selects the desired one or more LPs to be included in the one or more selected washers 101. According to various aspects of the present disclosure, at step 225, the user may select one or more solid LPs and also one or more optional liquid LPs using the presented GUI. In particular embodiments, the controller 103 may receive the user selected one or more LPs to be included in the one or more washers 101. In some embodiments, if the user does not select one or more LPs in the predetermined amount of time, the controller 103 may assign a default LP to the one or more selected washers 101.

Proceeding to step 230 and in one embodiment, after the controller 103 receives the data regarding the one or more selected washers 101 and the one or more selected LPs, the controller 103 stores the data in memory. In some embodiments, the memory is local to the controller. In other embodiments, the memory is located externally, such as in a remote database, cloud server, etc.

After the data regarding the user's one or more selected washers 101 and one or more selected LPs is stored by the controller 103, the process 2000 proceeds to step 235. In one embodiment, at step 235 the user may confirm the previously made washer 101 and LP choices. According to various aspects of the present disclosure, the controller 103 may be configured to present the user with further instructions via the GUI for a predetermined amount of time. In various embodiments, if the user fails to confirm the previously made washer 101 and LP selections, the process 2000 may jump back to step 200 whereby the user may need to restart the entire process 2000. If at step 235 the user confirms his/her previously selected washer 101 and/or LP choices, the process 2000 may proceed to step 240.

In one embodiment, at step 240 the controller 103 may receive a signal from the one or more selected washers 101 that the washers 101 are now in use. In various embodiments, this signal is transmitted from the washer circuit board 145.

After the controller 103 receives a signal indicating that the one or more washers 101 are now in use, the process 2000 proceeds to step 245. In one embodiment, at step 245 the controller 103 retrieves the previously stored data regarding the one or more LP selections. Once the appropriate LP data is retrieved at step 245, the process 2000 proceeds to the mechanical dispensing process 3000, wherein the controller 103 operates the system 1000 hardware to execute the appropriate LP mixtures in the one or more selected washers 101.

Now turning to FIG. 3, a flow chart of a process 3000 involving dispensing user-selected laundry products directly into washers 101 is shown according to one embodiment of the present disclosure. In certain embodiments, and discussed above in the detailed description of steps 245 and 3000 of FIG. 2, the process 3000 is initiated after a user has inputted his/her one or more washer 101 and LP selections, and the system has retrieved the inputted data from memory. In one embodiment, and in response to the system retrieving the stored data from step 245, the process 3000 begins at step 300 which involves the controller transmitting a signal to open one or more bowl solenoids, as appropriate based on the user configurations. In various embodiments, the appropriate bowl solenoid to open may be bowl #1 solenoid 110. In various embodiments, the controller 103 signals the bowl #1 solenoid 110 to open, thus allowing the pressure in the facility's water supply 117 to force water upward through the bowl #1 solenoid 110, through its corresponding flexible tubing 121 and spray jet 122, and thereby splash this water upward against the exposed solid LP within its corresponding jar 123. In particular embodiments, the water pressure within the pipe 118 may be provided by another appropriate source such as an engine or pump.

According to aspects of the present disclosure, the sprayed water dissolves a specified amount of the solid LP contained in the solid LP jar #1 123, and gravity then draws this mix of water and dissolved solid LP downward into the bowl #1 124. In various embodiments, this mix drains downward through the bowl 124 into another segment of flexible tubing 125. In particular embodiments, a maintenance user may provide input via the maintenance GUI to designate the specified amount of primary solid LP to be dissolved per use to be 0.3 ounces, and the corresponding duration of the bowl #1 solenoid 110 to be open to dissolve this amount of primary solid LP to be 7 seconds.

Continuing with FIG. 3, at step 305, after a specified amount of time to allow the mix of water and dissolved solid LP to drain out of the bowl #1 124 and down into the line of flexible tubing 125, the controller 103 signals the main peristaltic pump 109 to draw this mix up into the pump 109 and then further pump it out into the line of flexible tubing 136 where it then passes through the backflow preventer 126 and into the manifold 127. In one embodiment, the controller 103 simultaneously sends a signal to open the appropriate washer solenoid 108 corresponding to the user's selected washer 101. In various embodiments, this allows the pressure of the facility's water supply 117 and the pumping pressure from the main peristaltic pump 109 to flush the water and the product mix from the manifold 127 into the selected line of flexible tubing 135, which leads out of the cabinet 132 through an opening 138, where they flow into the vent 139 and ultimately the drum 140 of the user's selected $N^{th}$ washer 101. In certain embodiments, this mix therefore combines with the standard fill water already being dispensed into the washer 101.

At step 310, in one embodiment, it is determined if the user provided input via the touch-screen GUI to select a secondary liquid LP (e.g., fragrance, fabric softener, bleach, etc.). If at step 310 it is determined that the user did in fact provide input via the touch-screen GUI to select a secondary liquid LP, then the process proceeds to step 315.

At step 315, and in various embodiments, at a specified time the controller 103 also signals the corresponding liquid LP peristaltic pump 114 to pump liquid product from its jug of liquid LP 129 upward into the line of flexible tubing 136 where it meets the mix of water and dissolved solid LP and together with that mix is pumped through the backflow preventer 126, into the manifold 127 and ultimately into the drum 140 of the user's selected $N^{th}$ washer 101. In various embodiments and proceeding to step 320, the system is configured to allow the liquid LP peristaltic pump 114 to operate for a predetermined amount of time until the appropriate amount of liquid LP has been pumped into the fluid passageway.

Further, and at step 325, when nearly 100% of the dose of a selected optional liquid LP is dissolved, the corresponding liquid peristaltic pump 114 may shut off, thereby stopping any more primary solid LP from being dispensed to the selected $N^{th}$ washer 101.

In various embodiments, if at step 310 it was determined that the user did not provide input via the touch-screen GUI to select a secondary liquid LP, and also after step 325, the process proceeds to step 330. At step 330, when nearly 100% of the dose of primary solid LP is dissolved, the bowl #1 solenoid 110 may close off the water supply 117 to its corresponding spray jet 122, thereby stopping any more primary solid LP from being hydrated into bowl #1 124.

At step 335, and according to one embodiment of the present disclosure, an alternative bowl solenoid 110 is opened that is different from the bowl solenoid 110 opened at step 300. In various embodiments, in order to provide product replacement redundancy to ensure uninterrupted LP availability for users, one bowl 124 may be designated as the primary dispenser, and another bowl may be designated as the subordinate/alternative dispenser. In this non-limiting example, bowl solenoid #1 110 is designated to be the primary dispenser and open for nearly 100% of the duration specified for a single use (e.g., 7 seconds), and bowl solenoid #2 110 is designated to be the subordinate dispenser and open for some smaller percentage of the duration, for example about 12.5% (e.g., 1 second), thereby delivering about 12.5% more product per use than required. Continuing this non-limiting example, when the controller 103 determines the jar of solid LP #1 123 has exhausted its number of specified uses, for example 250 uses, and should therefore be empty, the controller 103 would then reverse these primary and subordinate assignments, and direct bowl solenoid #2 110 to open for nearly 100% of the duration specified for a single use, and bowl solenoid #1 to open for about 12.5% of the duration. Therefore if the jar of solid LP #1 123 becomes empty but is not replaced, the jar of solid LP #2 123 is then automatically dispensed, which is still 87.5% mostly full, in order to provide additional uninterrupted service for users in case maintenance users are delayed in replacing the empty jar. Concluding this non-limiting example, this arrangement also ensures that the empty jar of solid LP #1 123 receives a nominal amount (e.g., 12.5%) of extra water spray per use to ensure the jar 123 is completely empty and no excess product remains inside, so when it is ultimately removed by maintenance personnel it will be clean and ready to recycle.

In various embodiments, and proceeding to step 340 of the process 3000, the controlling system 103 waits a predetermined amount of time while the subordinate/alternative bowl #2 solenoid 110 is open in order to better distribute LP resources, as discussed immediately above.

Proceeding to step 345, in one embodiment, when the predetermined dose of primary solid LP is dissolved, the bowl #2 solenoid 110 closes off the water supply to its corresponding spray jet 122 thereby stopping any more primary solid LP from being hydrated.

Finally, in various embodiments, at step 350 when sufficient time has passed to allow all of the product mix to be dispensed into the selected $N^{th}$ washer 101, plus additional time to flush the system of any latent LP that may remain in the manifold 127, flexible tubing 135, and/or vent 139, the controller 103 signals the main peristaltic pump 109 to shut off and the specific washer solenoid 108 to close. In one embodiment, this additional flush time (as used herein, referred to as the "post-flush") ensures an RRL user's load of laundry will not be exposed to a previous user's selection of LP. In a non-limiting example, if one user of washer #1 101 selects secondary LP #1, and the next user of washer #1 101 selects fragrance-free, or secondary LP #2, then the post-flush ensures the second user's load of laundry will not include any trace amounts of secondary LP #1 from the previous use. The total duration of dispensing and post-flush is calibrated for each specific washer 101, based upon its physical distance from the cabinet 132. In a non-limiting example, if washer #1 101 is located 10 feet from the cabinet, the duration will be calibrated to ensure the mix of LP has enough time to deliver the LP that distance and to flush the system as described above. If the $N^{th}$ washer is 20 feet from the cabinet 132, then the duration will be calibrated in the same way for that distance.

Turning now to FIG. 4, a sequence diagram illustrating the timing of various system operations is shown according to one embodiment of the present disclosure. In various embodiments, the system is controlled according to predetermined timing configurations. In some embodiments, certain LPs may require more or less water than others for mixture and therefore the timing examples as shown in the present embodiment may be longer or shorter. In the present embodiment, the diagram begins at 0 seconds and ends after 32 seconds. It should be understood that the timing example shown in the present embodiment is for example purposes and should not be limiting to the present disclosure.

At step 400 in the present embodiment, the solenoid associated with bowl #1 124 and the corresponding solid LP jar 123 is opened and remains open for a predetermined amount of time, starting at time 0 seconds. In the present embodiment, the bowl #1 solenoid 110 is open for 7 seconds. In one embodiment, during the 7 second time interval, water may flow through the bowl #1 solenoid 110 and thereby allowing the water to exit the spray jet 122 and dissolve a portion of the LP in the solid LP jar 123. In various embodiments, a solution of water and dissolved LP may accumulate in the flexible tubing 125 for further pumping throughout the system.

Proceeding now to step 405, in one embodiment and at the 2 second time mark, the main peristaltic pump 109 and one or more washer solenoids 108 are activated into their respective on or open states. In various embodiments, the main peristaltic pump 109 and the one or more washer solenoids 108 may remain in their respective on or open states until the process ends at the 32 second mark. In certain embodiments, the main peristaltic pump 109 and the one or more washer solenoids 108 may stop or be closed before the process ends, depending on certain system configurations. According to various aspects of the present disclosure, at step 405 the system facilitates the flow of LP solutions throughout the system into the appropriate washers 101, and further allowing additional water to flow throughout the system in order to flush-out any remaining LPs.

At step 410, in one embodiment and from the 3 second mark until the 6 second mark, one or more liquid LP peristaltic pumps 114 may be activated in order to combine one or more liquid LPs with the solution currently being created at step 400. In various embodiments, step 410 ends before both steps 400 and 405 in order to allow for the solution created at step 400 to be mixed with the liquid LP from step 410, and further pumped throughout the system during step 405.

In various embodiments, step 415 begins at the 8 second mark and ends at the 9 second mark. In one embodiment, during step 415, the bowl #2 solenoid 110 is opened thereby allowing water to flow to the spray jet 122 and dissolve a portion of the LP in the solid LP jar #2 123. In various embodiments, a solution of water and dissolved LP may accumulate in the flexible tubing 125 for further pumping throughout the system. In various embodiments, the system may activate other solenoids and mechanisms in order to facilitate other mixtures of one or more LPs.

Referring now to FIG. 5, a flowchart of an exemplary GUI process is shown according to one embodiment of the present disclosure. In various embodiments, a user may be presented with a process similar to the process in the present embodiment in order to configure the system with the desired washer 101 and/or LP selections. In one embodiment, the process begins at step 500 where a user is presented with images indicating that the process has been initiated.

Proceeding now to step 505, in one embodiment, the user may be presented with the option to select one or more washers. In various embodiments, the user may be presented with a time limit (such as 15 seconds) wherein the user can make his/her choice, otherwise the process may terminate.

In various embodiments, the user may be presented with LP options at step 510. In certain embodiments, the user may be presented with a plurality of scents, as well as an unscented option. In some embodiments, if the user does not make a scent selection, the unscented option may be automatically chosen as default. In certain embodiments, the system may store user preferences and allow a user to configure a scented default option.

In one embodiment, the process proceeds to step 515 wherein a user is presented with the opportunity to configure and activate additional washers. In other embodiments, such as an embodiment where a user may be required to pay per use of each washer 101, step 515 may present the user with the opportunity to pay for additional washers 101.

At step 520 in the present embodiment, the system determines if the user has selected to activate one or more additional washers 101. In various embodiments, if the user selects to activate one or more additional washers 101, the process may jump to step 505 where the user is presented with the option to selects the desired washer(s) 101. In other embodiments, the user may be directed to a payment terminal in order to select and activate the desired washer(s) 101. If at step 520 it is determined that the user does not wish to select and active one or more additional washers 101, the user may be presented with a "Thank You" screen at step 525, and the process may terminate.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that affects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

The invention claimed is:

1. A system, comprising:
a mobile computing device comprising a display configured to receive instructions from a system user in connection with dispensing laundry products into a plurality of washing machines, wherein the system user interacts with a graphical user interface corresponding to a mobile application presented on the display at the mobile computing device to provide the instructions;
a cloud-based control system communicatively connected to the mobile computing device and programmed to transmit to and receive commands from the mobile computing device, wherein the cloud-based control system receives the instructions comprising:
a user-selected indication of a first laundry product, a second laundry product, and a particular washing machine of the plurality of washing machines; and
a selection-confirmation signal, wherein the selection-confirmation signal is generated at the mobile computing device in response to the system user confirming, via physically engaging a confirmation screen of the graphical user interface, the user-selected indication of the first laundry product, the second laundry product, and the particular washing machine, and wherein the confirmation screen is displayed on the graphical user interface for a predetermined time threshold;
a fluid passageway in fluid communication with a water supply and adapted to facilitate a water flow and a plurality of laundry products through the system to the plurality of washing machines;
a plurality of controllable bowl solenoids each operatively connected to the cloud-based control system, each bowl solenoid associated with a respective first laundry product source containing a primary source and a subordinate source of the first laundry product and operative to facilitate the water flow through the respective bowl solenoid upon receipt of the selection-confirmation signal from the cloud-based control system, wherein the primary source of the first laundry product receives a particular amount of water from the respective bowl solenoid for dispensing a particular amount of the first laundry product from the primary source, wherein the subordinate source of the first laundry product receives a nominal amount of water from the respective bowl solenoid for dispensing a nominal amount of the first laundry product from the subordinate source, wherein the nominal amount of water is a nominal percentage of the particular amount of water received at the primary source of the first laundry product, and wherein the primary source and the subordinate source of the first laundry product switch respective designations in response to detecting a near-empty state at the primary source of the first laundry product, whereby the primary source is then designated as a new subordinate source and subsequently receives the nominal amount of water, whereby the water flow mixes with the primary source and then subordinate source of the first laundry product and collects in a bowl to create a first laundry product mixture, whereby the first laundry product mixture is introduced into the fluid passageway;
a plurality of controllable peristaltic pumps each operatively connected to the cloud-based control system, each peristaltic pump associated with a respective second laundry product source containing the second laundry product and operative to facilitate introduction of the second laundry product into the fluid passageway upon receipt of the selection-confirmation signal from the cloud-based control system; and
a plurality of controllable washer solenoids each operatively connected to the cloud-based control system, each washer solenoid associated with a respective washing machine of the plurality of washing machines and operative to facilitate the transmission of the water flow, the first laundry product mixture, and the second laundry product through the fluid passageway into the particular washing machine upon receipt of a corresponding command from the cloud-based control system.

2. The system of claim 1, wherein the first laundry product source comprises a container having a solid laundry soap therein positioned vertically above a catch bowl and adapted to receive a water spray from the fluid passageway, create a water and soap mixture, and deliver the mixture back into the fluid passageway.

3. The system of claim 1, wherein the first laundry product comprises soap.

4. The system of claim 1, wherein the second laundry product comprises a fabric softener, a fragrance, or bleach.

5. The system of claim 1, further comprising a third-party payment terminal operatively connected to the display and the cloud-based control system and operative to accept financial payment prior to dispensing laundry products into the plurality of washing machines.

6. The system of claim 1, wherein first laundry product and second laundry product are different.

7. The system of claim 1, wherein the nominal percentage of the amount of water received at the primary source is about 12.5 percent.

* * * * *